(12) United States Patent
Asano

(10) Patent No.: US 6,192,484 B1
(45) Date of Patent: Feb. 20, 2001

(54) METHOD AND SYSTEM FOR RECOVERING LOST DATA

(75) Inventor: Yoshiaki Asano, Tokyo (JP)

(73) Assignee: NEC Corporation, Tokyo (JP)

(*) Notice: Under 35 U.S.C. 154(b), the term of this patent shall be extended for 0 days.

(21) Appl. No.: 09/037,634

(22) Filed: Mar. 10, 1998

(30) Foreign Application Priority Data

Mar. 11, 1997 (JP) .................................................. 9-056234

(51) Int. Cl.⁷ .................................................. G06F 11/16
(52) U.S. Cl. .............................. 714/6; 714/36; 711/114; 711/156
(58) Field of Search .............................. 714/6, 7, 36, 54, 714/42, 719, 819, 5; 711/114, 156; 707/202

(56) References Cited

U.S. PATENT DOCUMENTS

| | | | |
|---|---|---|---|
| 5,195,100 | * 3/1993 | Katz et al. .............................. | 371/66 |
| 5,333,309 | * 7/1994 | Hibi ...................................... | 395/575 |
| 5,574,882 | 11/1996 | Menon et al. ........................ | 395/441 |
| 5,584,029 | * 12/1996 | Izui et al. .............................. | 395/750 |
| 5,596,709 | 1/1997 | Bond et al. ...................... | 395/182.05 |
| 5,644,767 | * 7/1997 | Rathunde ............................. | 395/651 |
| 5,729,552 | * 3/1998 | Yorimitsu ............................ | 371/21.1 |
| 5,878,201 | * 3/1999 | Onishi ............................. | 395/182.04 |

FOREIGN PATENT DOCUMENTS 7-56694   3/1995 (JP) .

* cited by examiner

Primary Examiner—Robert W. Beausoliel, Jr.
Assistant Examiner—Scott T. Baderman
(74) Attorney, Agent, or Firm—Sughrue, Mion, Zinn, Macpeak & Seas, PLLC

(57) ABSTRACT

An endeavor is made to enhance system reliability by automatically detecting the status of each HDD at startup, and detecting failures in nonvolatile memory as well so that a failure does not occur when restarting the system after it has gone down. Consequently, the present invention is a method for operating a disk array, this disk array comprising a plurality of physical disks, an intrinsic data memory, which stores intrinsic data read from this disk, an array controller, which controls the disk, and a status data memory, which stores status data indicating the control status of this array controller. Then, in accordance with the present invention, this operating method reads intrinsic data from each disk. And then the connection status of the array controller and disks is checked by comparing intrinsic data read from a disk with intrinsic data stored in memory. Next, in accordance with the connection status of the controller and disks, and the status data stored in status data memory, it is determined whether or not recovery processing will be performed for data stored on a disk.

22 Claims, 13 Drawing Sheets

F I G. 1
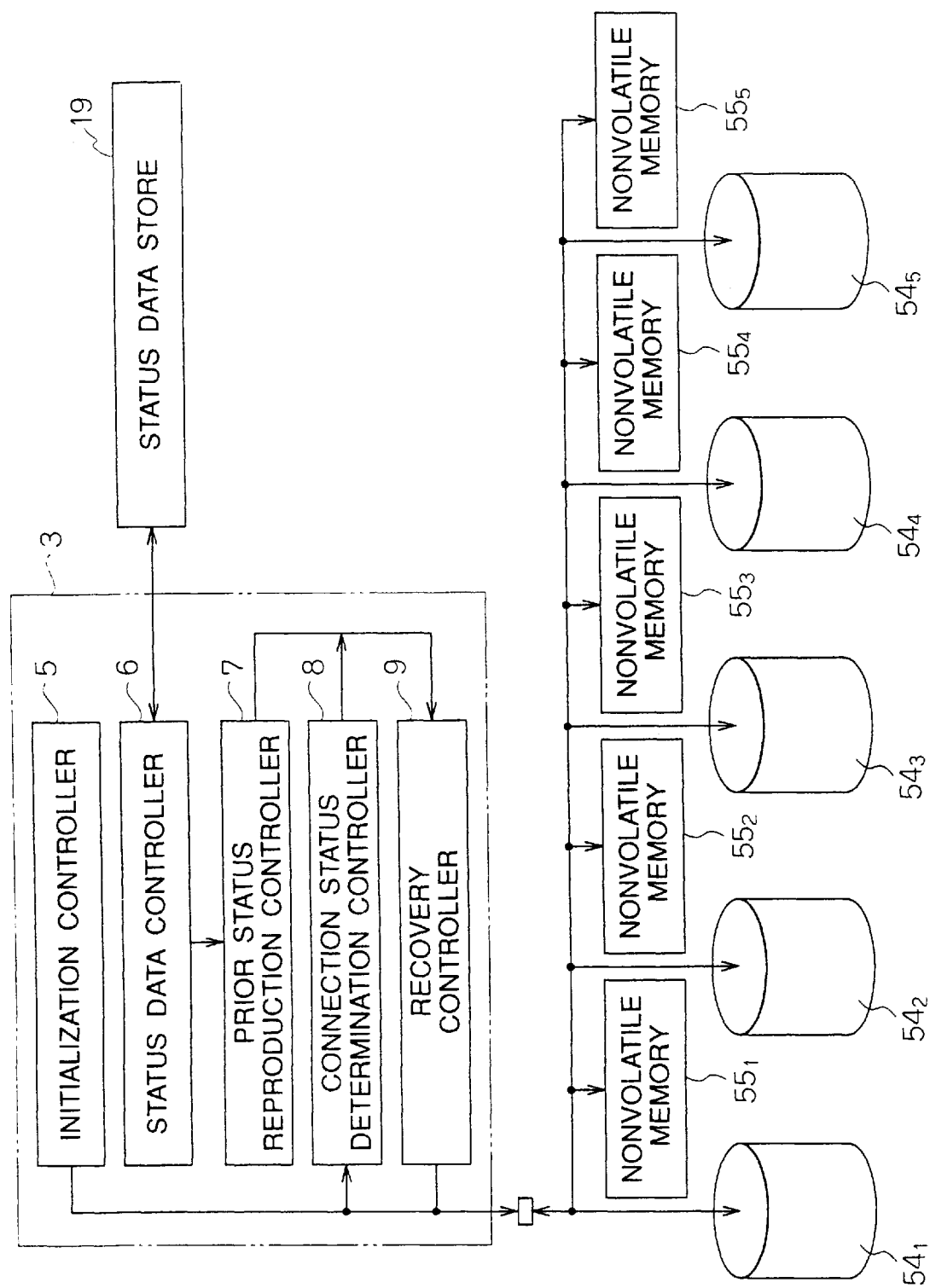

F I G. 7
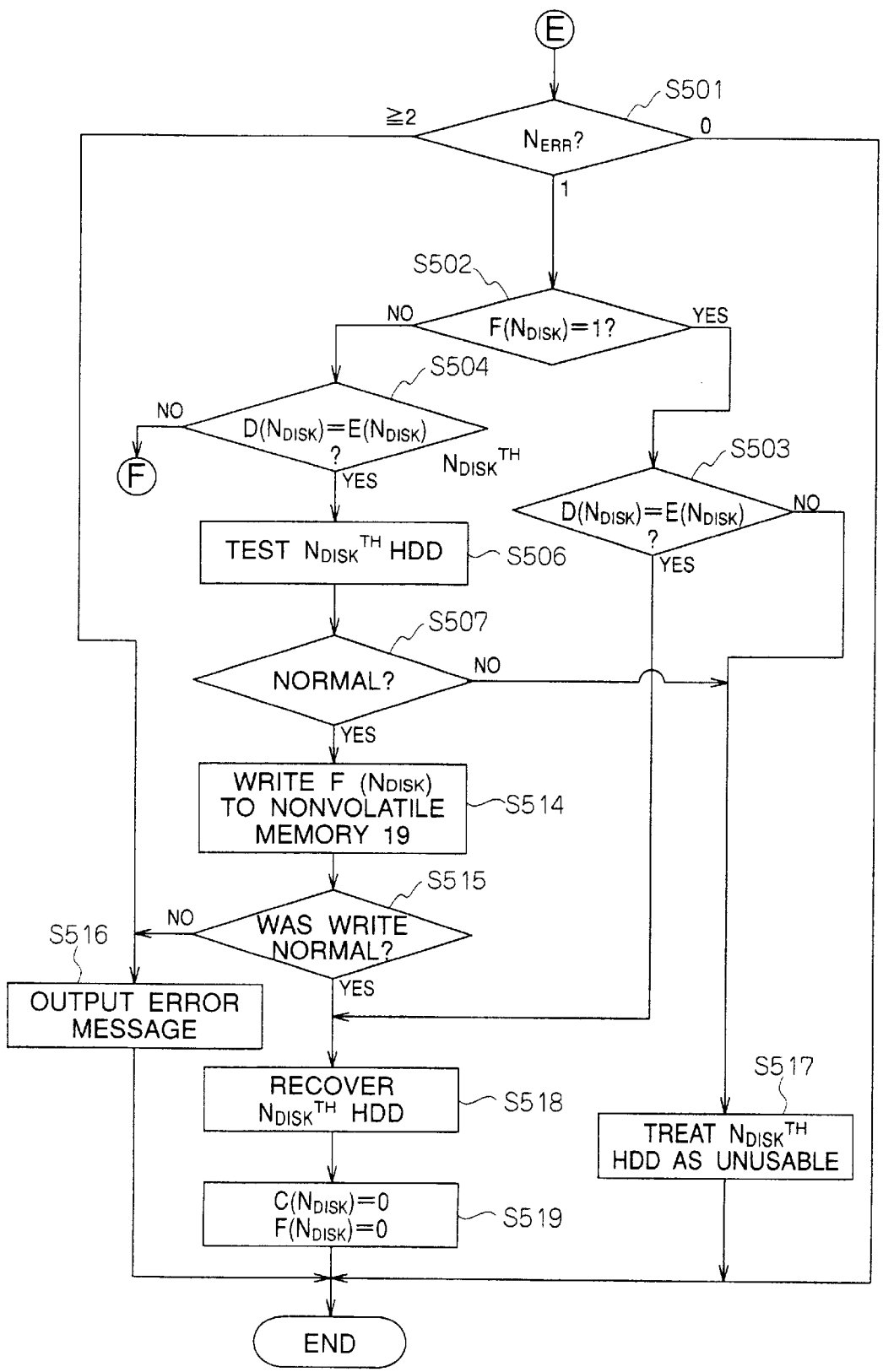

FIG. 9 PRIOR ART
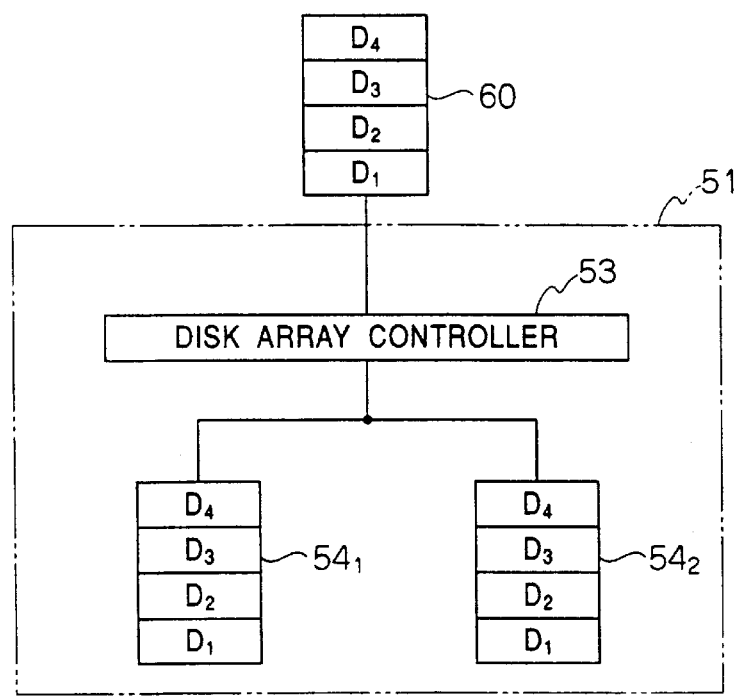
FIG. 10 PRIOR ART
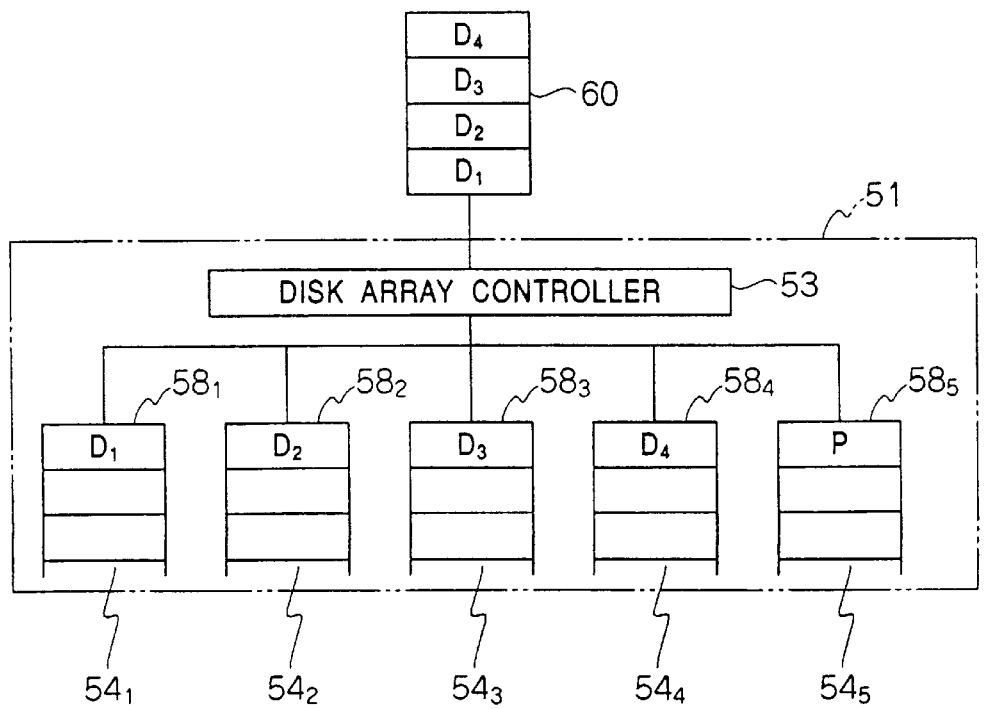

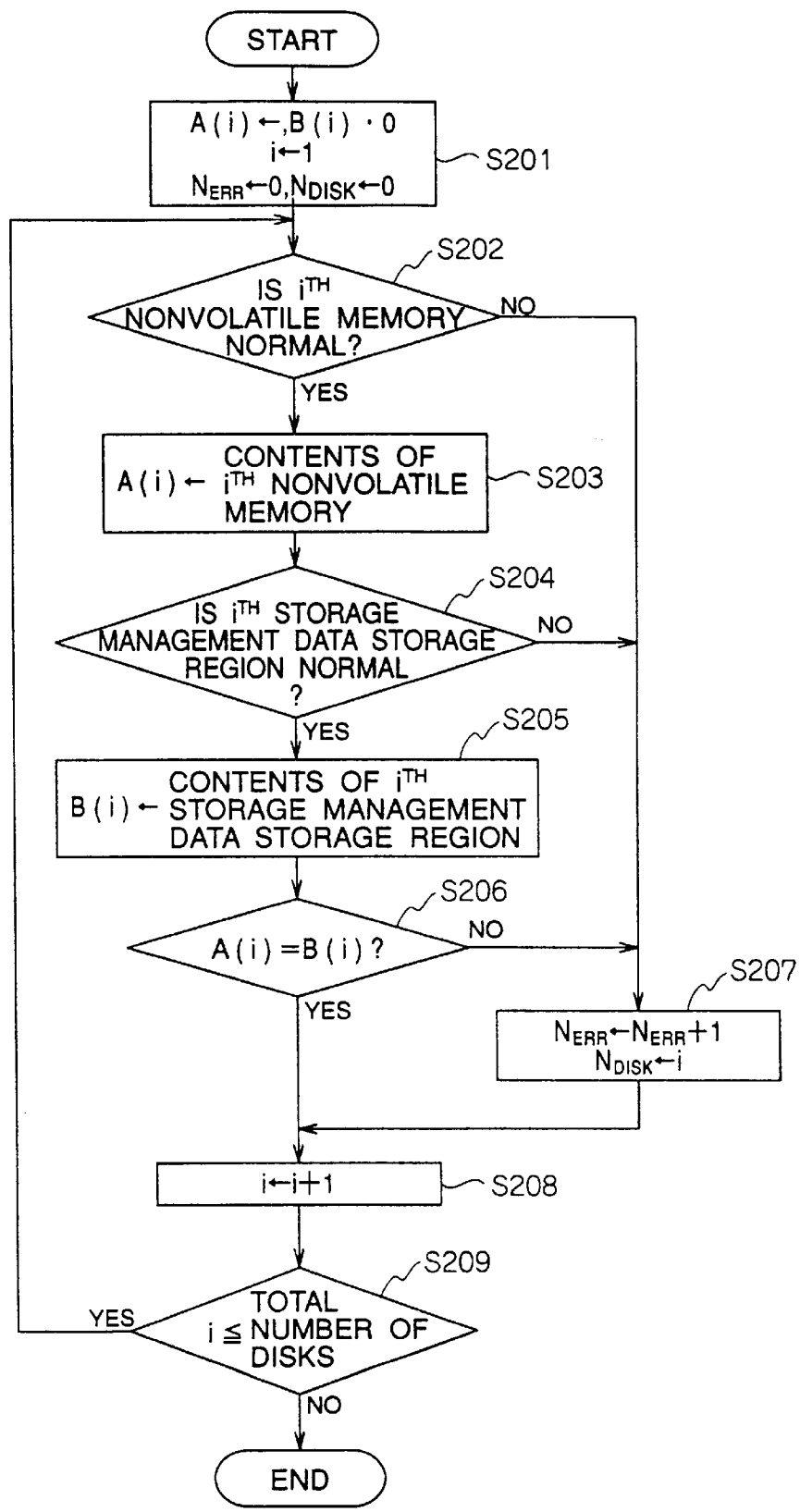

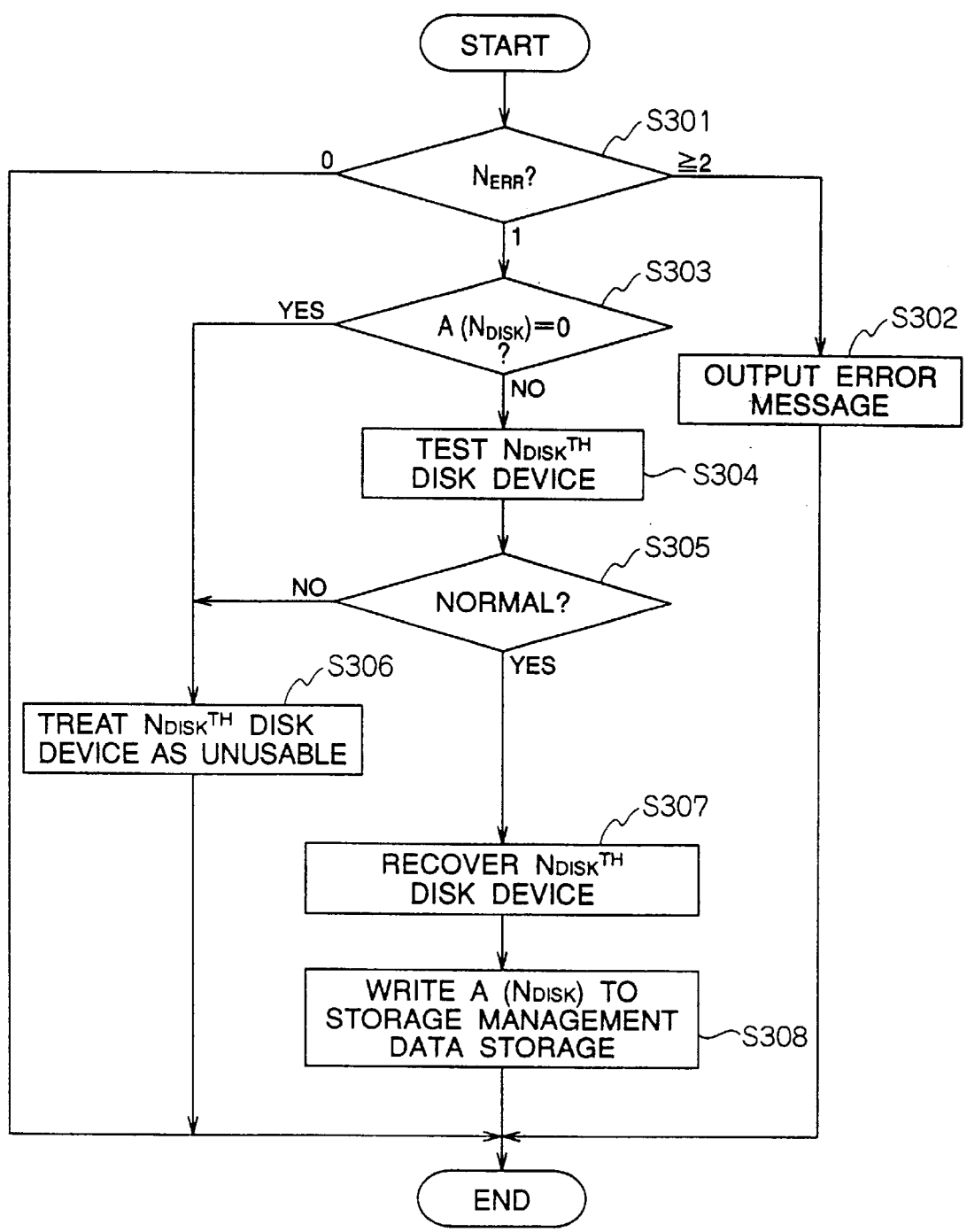

F I G. 1 4 PRIOR ART
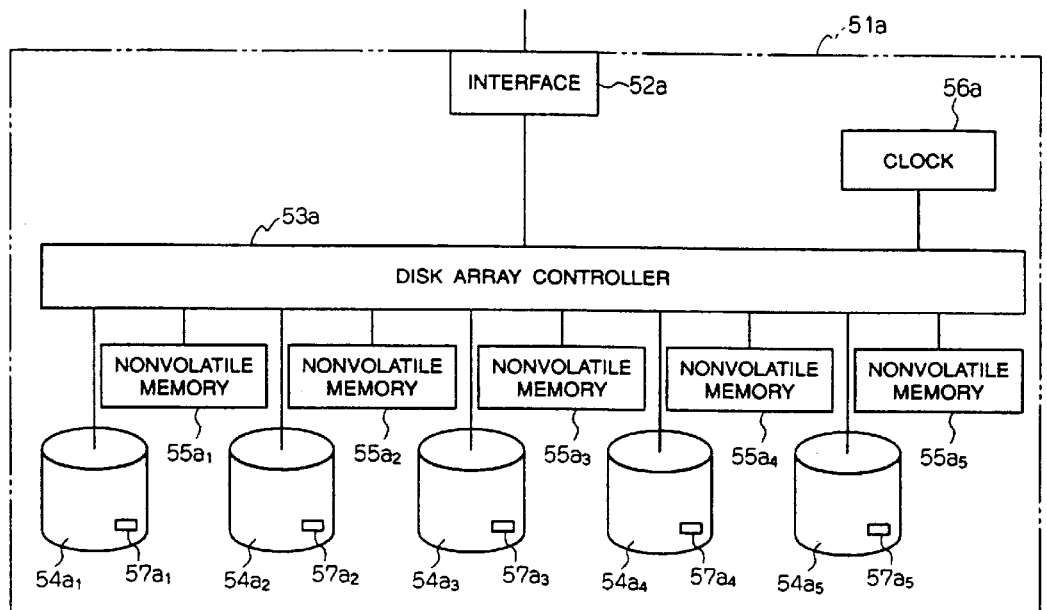
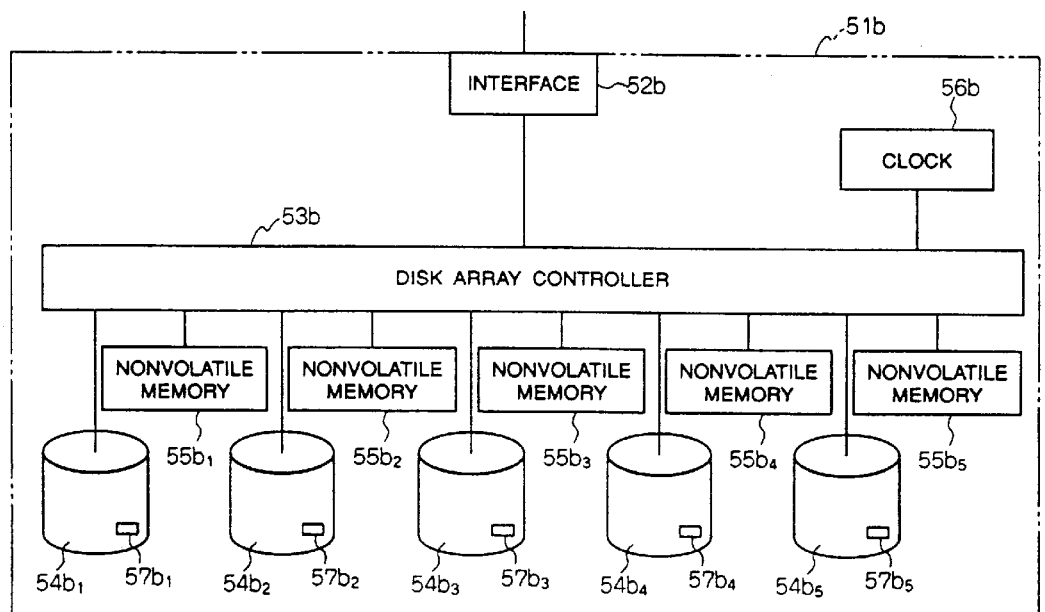
(HDD FOR REPLACEMENT)
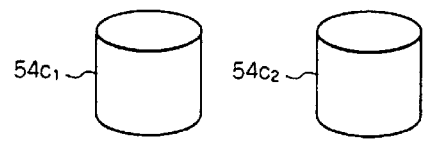

METHOD AND SYSTEM FOR RECOVERING LOST DATA

BACKGROUND OF THE INVENTION

1. Field of the Invention

The present invention relates to a disk array system, and more particularly to a disk array system for storing data in a plurality of magnetic disk devices (hard disk drive (HDD)) using a redundancy configuration.

2. Description of the Related Art

In the past, a redundant array of inexpensive disks (RAID) Level 0, which stores data on a single HDD, was the norm. Thereafter, so as to further enhance reliability, RAID Level 1 disk array systems, which store the same data on a plurality of HDD, and RAID Levels 3, 4 and 5 disk array systems, which store data in a distributed fashion on a plurality of HDD, were utilized.

With a RAID Level 0 magnetic disk device, when data stored on an HDD was lost, it was no longer possible to use that data.

With RAID Levels 1, 3, 4 and 5 disk array systems, data is made redundant, so that even if data stored on one of the built-in HDD units is lost, when the disk array system is viewed as a whole, that data can be restored. For this reason, workstations, network servers and other equipment that requires large-capacity external storage systems have come to make use of disk array systems that utilize RAID Level 1, 3, 4 or 5 arrays.

The operation of a dual magnetic disk device, called a RAID Level 1, is explained using FIG. 9. When a disk array controller 53 receives a write request from a host, the write-requested data 60 is written to both HDD $54_1$ and $54_2$. When, as a result of this write operation, it is possible to read the data from both HDD, by comparing HDD $54_1$ data against HDD $54_2$ data, a highly accurate data read is possible.

And even when it is not possible to read data from one of the HDD, the data can still be obtained be reading it from the other HDD. For example, when it is not possible to read data from HDD $54_1$, the data can be obtained by reading it from HDD $54_2$ alone.

FIG. 10 is a schematic depicting the configuration of a disk array system 51 when a redundancy configuration, called RAID Level 4, is used. When a disk array controller 53 receives a write request from a host, the write-requested data 60 is divided into sector units and written in a distributed fashion to storage regions $58_1$–$58_4$ of HDD $54_1$–$54_4$.

The disk array controller 53 does not simply distribute the data at this time. That is, it performs an Exclusive OR (XOR) operation on data $D_1$, $D_2$, $D_3$, $D_4$ stored in corresponding storage regions $58_1$–$58_4$, and writes the result of this operation, parity P, to storage region $58_5$ of HDD $54_5$. This XOR operation provides redundancy to the data. Therefore, all of the data is stored in a format that is capable of being reconstructed on the basis of other data parity.

For example, the parity P XOR operation result for data $D_4$ is the same as those for data $D_1$, $D_2$, $D_3$. Consequently, if it is not possible to read storage region $58_4$, when the data in this HDD storage region and the parity are read out and subjected to an XOR operation, data $D_4$ can be obtained without reading storage region $58_4$.

Further, with a conventional disk array system, data specifying a failed HDD is stored in volatile memory. Consequently, when the system goes down as a result of a power outage or something, data specifying the failed HDD is lost.

By comparison, with a disk array system, various systems are proposed, whereby data specifying a failed HDD is stored in nonvolatile memory.

For example, in Japanese Patent Publication No. A7-56694, a control method for a system, which uses nonvolatile memory to store the status of a magnetic disk device, is proposed.

FIG. 11 depicts the configuration of this conventional disk array system. The disk array system 51 comprises an interface 52, a magnetic disk controller (disk array controller) 53, perhaps 5 magnetic disk devices (HDD) $54_1$–$54_5$, nonvolatile memory $55_1$–$55_5$ corresponding to each HDD, and a clock 56.

The interface 52 inputs data access requests from a host 61 (either read or write requests) to the disk array controller 53.

The disk array controller 53 comprises means for performing a data read or write operation by controlling the HDD 54 in accordance with the contents of a request output from the host, and means for determining the status of each HDD based on data in nonvolatile memory 55, and data stored in a storage management data storage region 57 created on the respective disk media. The clock 56 is used to rewrite date and time data in nonvolatile memory 55 storage management data when a failure occurs.

An overview of this prior example is provided by referring to FIGS 12 and 13. This prior example uses a variable "i", which specifies in sequence a plurality of HDD, a parameter "$N_{DISK}$", which specifies a failed HDD when a failed HDD exists, and a parameter "$N_{ERR}$", in which the count value of the number of failed HDD is stored. Also, storage management data stored in each nonvolatile memory 55 depicted in FIG. 11 is stored in array A (i), and storage management data stored in the storage management data storage region 57 is stored in array B (i).

Since this prior example employs a redundancy configuration that makes data recovery possible even if an entire disk's worth of data is lost, when the value of "$N_{ERR}$", in which the count value of the number of failed HDD is stored, is 2 or more, it treats the entire disk array system as abnormal. And, based on the parameter which specifies a failed HDD, this prior example determines whether or not the failed HDD was replaced with a new HDD, and when it determines that the device is a new HDD, it automatically performs recovery processing.

Further, with this prior example, at initialization, the disk array controller 53 stores storage management data containing date/time information in the storage management data storage region 57 of the HDD, and in the nonvolatile memory 55 provided with the pertinent HDD. Also, when an HDD fails, the disk array controller stores the date and time the failure occurred in the nonvolatile memory provided with the failed HDD. Therefore, it is possible to check whether or not the pertinent HDD is the failed disk by comparing the contents of nonvolatile memory 55 with the contents of the storage management data storage region 57.

Specifically, first, as shown in FIG. 12, "0" is set in array variables A(i), B (i), "1" is set in counter i, "0" is set in failed HDD counter $N_{ERR}$, and "0" is set in failed HDD identification parameter $N_{DISK}$ (S201).

Then, the $i^{th}$ nonvolatile memory is tested, and when nonvolatile memory is not normal (N), a determination is made as to the usability of that HDD, $N_{ERR}$ is incremented to "1", i is set in $N_{DISK}$ (S207) and processing proceeds to S208.

When nonvolatile memory is normal (S202: Y), the contents of that nonvolatile memory are written to array variable A(i). Next, the $i^{th}$ HDD storage management data storage region is tested, and when the storage management data storage region is not normal (S204: N), processing proceeds to S207. When the storage management data storage region is normal (S204: Y), the contents of that storage management data storage region are set in B (i) (S205).

When array variables A (i) and B (i) do not match (S206: N), since the $i^{th}$ HDD is not a normal HDD, $N_{ERR}$ is incremented to "1", and i is set in $N_{DISK}$ (S207). Next, "1" is added to i (S208), and when i is not greater than the number of HDD (S209: Y), processing returns to S202 and the next nonvolatile memory, storage management data storage region is tested. This type operation is repeated until i becomes greater than the total number of HDD.

Next, the number of failed HDD $N_{ERR}$ is determined (S301). When $N_{ERR}$ is "0", all HDD are normal and the startup operation ends. When $N_{ERR}$ is "2" or larger, an error message is output (S302), and the restart operation ends. When $N_{ERR}$ is "1", A ($N_{DISK}$) is compared to "0", and when A ($N_{DISK}$) is "0" (S303: Y), nonvolatile memory is determined to be abnormal at step S202. Since the contents of that nonvolatile memory are not stored in array A ($N_{DISK}$), the $N_{DISK}^{th}$ nonvolatile memory is abnormal, and the $N_{DISK}^{th}$ HDD is therefore deemed unusable (S306).

When the A ($N_{DISK}$) is not "0" (S303: N), there are times when the $N_{DISK}^{th}$ HDD could be usable. Therefore, that HDD is tested (S204).

Then, when that HDD is determined to be abnormal (S305: N), that HDD is deemed unusable (S306), and when it is determined to be normal (S305: Y), recovery work is performed by writing data reconstructed from data in other HDD to that HDD (S307). Once recovery work is complete, A ($N_{DISK}$) is written to that HDD's storage management data storage region, and the restart operation ends.

However, this prior example is inadequate in that when replacing a failed HDD, if an HDD that already has data stored therein is mistakenly connected as the new HDD, recovery data is written to the HDD with data already stored therein without an error of any kind being detected, thus resulting in the original data being lost.

That is, when there are a plurality of disk array systems configured as shown in FIG. 11, and a plurality of failed HDD, the procedures depicted in FIGS. 12 and 13 will give rise to a failure at restart following the replacement of the failed HDD.

For example, assume there are 2 magnetic disk devices of the type shown in FIG. 11, and 2 HDD to be replaced, and assume that HDD $54a_1$ in disk array system $51a$, and HDD $54b_2$ in disk array system $51b$, as shown in FIG. 14, are the failed HDD.

Because disk array system $51a$ and disk array system $51b$ are each operating independently, the data being written to HDD $54a_1$–$54a_5$ and $54b_1$–$54b_5$ are different.

When replacing the failed HDD $54a_1$ and $54b_2$ with the new HDD $54c_1$ and $54c_2$, instead of disk array system $51a$'s failed HDD $54a_1$ being removed, HDD $54a_2$, which is operating normally, is removed, and replaced with the new HDD $54c_1$. Then, disk array system $51b$'s failed HDD $54b_2$ is removed, and previously-removed HDD $54a_2$, which operated normally in disk array system $51a$, is mounted. After both magnetic disk devices have been replaced, they are simultaneously restarted.

That is, a magnetic disk device that is not failing is changed for a new replacement magnetic disk device, and a failing magnetic disk device is replaced with one that is mistaken for a replacement magnetic disk device.

In this case, since failed HDD $54a_1$ and new HDD $54c_1$ (in the place where HDD $54a_2$ was located) become failed HDD, disk array system $51a$ is in an unusable state. On the other hand, since disk array system $51b$'s failed HDD $54b_2$ is replaced by normally-operating HDD $54a_2$, recovery commences.

Since the data in disk array system $51a$'s HDD $54a_2$ is lost when the recovery operation is performed for disk array system $51b$, data from 2 HDD, $54a_1$ and $54a_2$, are lost, and recovery work cannot be carried out for disk array system $51a$.

That is, it was a problem in that when a normal magnetic disk device was removed from one disk array system, connected to another disk array system, and recovery work performed, failure recovery could not be performed for one of the disk array systems. This kind of problem will not occur if the user of the magnetic disk device does not make a mistake when replacing the HDD. However, it is desirable for the magnetic disk device to make data redundant so that, in addition to enhancing its reliability as a storage device, it can also cope with human errors such as this.

With the prior example, the possibility that data might be lost during recovery processing is not taken into consideration like this.

Further, treating nonvolatile memory $55_1$–$55_4$ as a single nonvolatile memory, and partitioning the regions in which storage management data is stored, enables nonvolatile memory to correspond to each HDD. But when nonvolatile memory is treated as a single memory, the nonvolatile memory test of the system control method shown in FIGS. 12 and 13 takes the form of the tests conducted on the respective storage management data storage regions of nonvolatile memory, resulting in cases where failures of nonvolatile memory itself are not detected.

For example, when a failure occurs in an HDD, and the storage management data storage region of nonvolatile memory is rewritten, nonvolatile memory, which has operated normally up until now, could generate a write failure. This could either make it impossible to rewrite data, or result in the same data that existed prior to rewrite being rewritten. Thereafter, if the device is restarted without detecting the failure, the test of the storage management data storage region where the write failure occurred in nonvolatile memory ends normally, and it appears that the device is fault free. And even if the test of the storage management data storage region where the write failure occurred generates an error, the other storage management data storage regions will appear normal.

When a nonvolatile memory failure occurs in a magnetic disk device employing a single nonvolatile memory, this creates situations wherein it is impossible to detect HDD failures, and the failing regions cannot be used, but other regions can be used. This makes it impossible to learn the correct status of a magnetic disk device.

This problem is felt to be caused by various failures that occur in the circuitry. For that reason, it is desirable that the device possess mechanisms for detecting failures when problems like this occur.

SUMMARY OF THE INVENTION

An object of the present invention is to provide a disk array system capable of improving on the inadequacies inherent in related prior examples, and, more particularly, of performing recovery processing appropriately in accordance with the status of a magnetic disk device.

Specifically, the present invention attempts to enhance the reliability of a disk array system by automatically detecting the status of each HDD at startup, and detecting failures in nonvolatile memory as well, so as to eliminate failure when restarting a system after it has gone down.

And the present invention attempts to enhance the reliability of a disk array system by also detecting HDD connection mistakes so as to eliminate the loss of data resulting from human error.

Furthermore, the present invention attempts to enhance the maintainability of a disk array system by commencing recovery via human intervention when a failed HDD is replaced so as to prevent the loss of data resulting from mistakes made at replacement, and by implementing automatic detection operations and commencing recovery processing at restart so that even if the system goes down after recovery has begun, inputting via the host will not be necessary.

Accordingly, the present invention is a method for operating a disk array, and this disk array comprises a plurality of physical disks, an intrinsic data memory, which stores intrinsic data read from these disks, an array controller that controls the disk array, and a status data memory, which stores status data indicating the status of this array controller. And then, in accordance with the present a invention, the pertinent operating method reads intrinsic data from each disk at startup. Then, the connection status of the array controller and disks is checked by comparing the intrinsic data read from the disk with the intrinsic data stored in memory. Next, in accordance with the connection status of the controller and disks, and the status data stored in status data memory, it is determined whether or not recovery processing is to be implemented on data stored on the disk.

With the present invention, data is stored in a redundancy configuration on each magnetic disk device. Consequently, for example, even if a failure occurs on 1 magnetic disk device, making a data read impossible, the data that was stored on the failed magnetic disk device concerned can be reconstructed from data stored on another magnetic disk device.

Further, with the present invention, at the initialization of each magnetic disk device, intrinsic data is read from each magnetic disk device concerned, and each intrinsic data concerned is stored in a respective intrinsic data storage region. This intrinsic data employs data that is always provided with each magnetic disk device. For example, the vendor's name and the serial number of each magnetic disk device can be used. Consequently, it is possible to identify each magnetic disk device more accurately than when the magnetic disk controller assigns intrinsic data independently. Therefore, by comparing intrinsic data when the power is turned ON, and when the system is restarted following a failure, the controller can accurately determine whether or not a magnetic disk device has been replaced.

Furthermore, with the present invention, the controller rewrites in accordance with changes in the status of a magnetic disk device status daza that controls the operating status as to the presence or absence of a magnetic disk device failure, and/or whether or not recovery processing is in progress. The controller also controls the commencement or continuation of recovery processing based on connection status data, and the prior operating status data of each magnetic disk device reproduced by a prior status reproduction means. Therefore, whether or not recovery processing is carried out is determined in accordance with the status immediately prior to startup and the current connection status. Consequently, when a man-made connection error occurs, this can be accurately detected and a process for terminating recovery processing can be implemented.

For example, recovery processing commences automatically only when there are no man-made connection errors, and the host can be queried when a replacement has been made. This means required data is not overwritten by the recovery process, thus enabling the provision of a disk array system of heretofore unknown superiority capable of more enhanced reliability.

BRIEF DESCRIPTION OF THE DRAWINGS

FIG. 7 is a flowchart depicting an example of a restart operation, which is a continuation of the connection status confirmation process shown in FIGS. 5 and 6;

FIG. 9 is a schematic diagram depicting an overview of a conventional RAID Level 0 magnetic disk device write operation;

FIG. 10 is a schematic diagram depicting an overview of a conventional RAID Level 4 disk array system write operation;

FIG. 11 is a block diagram depicting an example of a schematic configuration of a conventional disk array system;

FIG. 12 is a flowchart of an operation for determining the status of each HDD at startup of a conventional disk array system;

FIG. 13 is a continuation of the flowchart shown in FIG. 12 depicting the operation for determining the status of each HDD at startup of a conventional disk array system; and FIG. 14 is a schematic diagram depicting an example of failed HDD replacement in a disk array system that possesses two or more conventional configurations.

DESCRIPTION OF THE PREFERRED EMBODIMENTS

Figure 1:
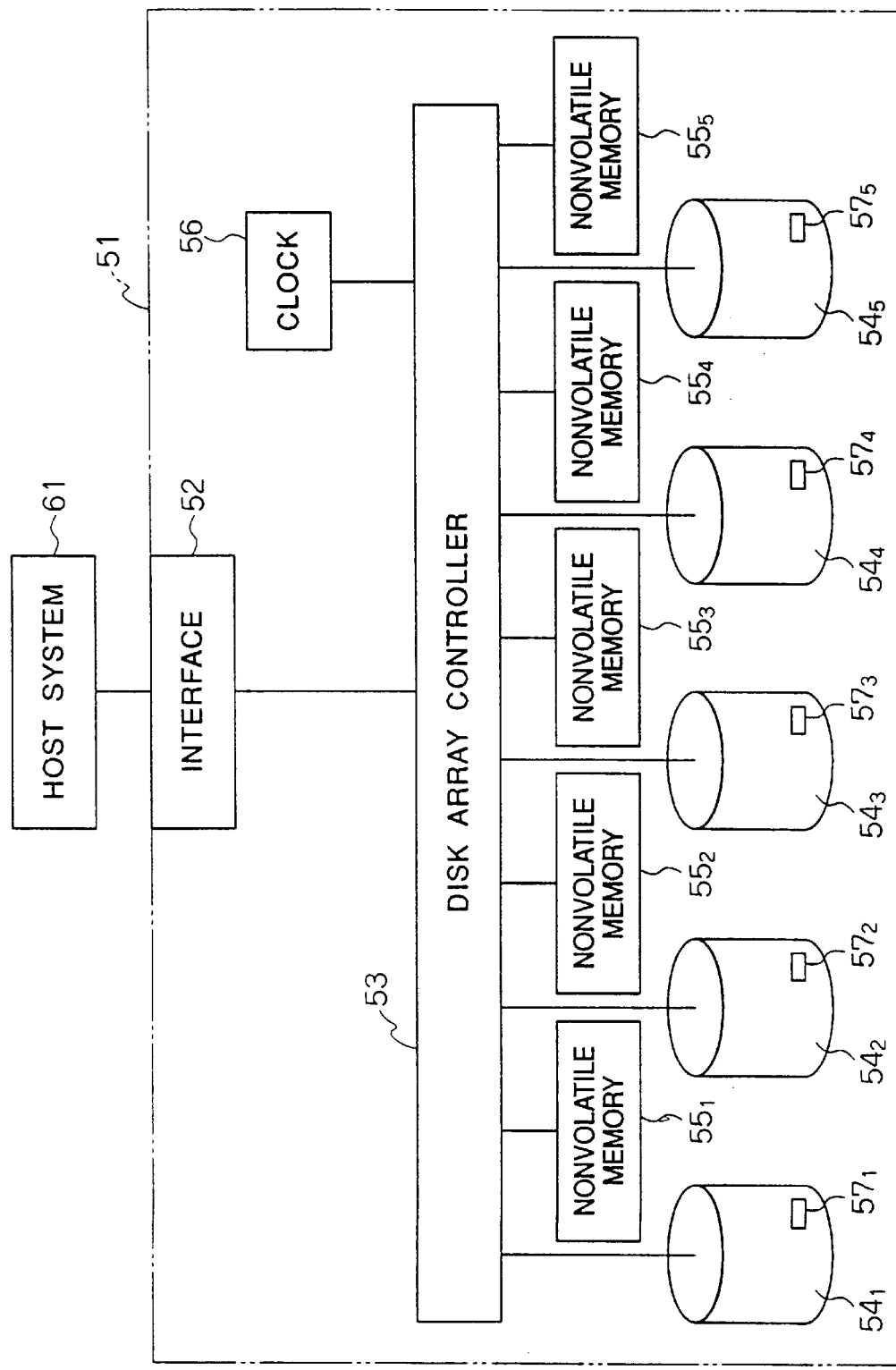
FIG. 1 is a block diagram depicting the configuration of an embodiment of the present invention.

FIG. 1 is a block diagram depicting the configuration of an embodiment of the present invention. The disk array system in accordance with this embodiment, as shown in FIG. 1, comprises a plurality of magnetic disk devices (HDD) $54_1$–$54_5$, which store in a redundancy configuration data sent from a host; fixed nonvolatile memory (nonvolatile memory) $55_1$–$55_5$, which stores in each HDD intrinsic data that identifies this plurality of HDD $54_1$–$54_5$; and a magnetic disk controller (disk array controller) 3, which determines the connection status of the HDD $54_1$–$54_5$ based on the intrinsic data stored in this nonvolatile memory $55_1$–$55_5$, and which, when an abnormality occurs in an HDD $54_1$–$54_5$, restores on the basis of the redundancy configuration the data lost as a result of the abnormality concerned.

Moreover, the disk array controller 3 comprises an initialization controller 5 for reading intrinsic data from each HDD $54_1$–$54_5$ concerned at HDD $54_1$–$54_5$ initialization, and for storing in the respective nonvolatile memory $55_1$–$55_5$ each intrinsic data concerned; and a status data controller 6 for rewriting in accordance with HDD $54_1$–$54_5$ status changes status data, which controls operational status as to the presence or absence of HDD $54_1$–$54_5$ failure, and whether or not recovery processing is in progress.

Furthermore, the disk array controller 3 is provided with a nonvolatile status data store 19, which stores edited status data in accordance with the status data controller 6.

And the disk array controller 3 comprises a prior status reproduction controller 7, which, when restarting the HDD $54_1$–$54_5$, reproduces the operational status of each HDD $54_1$–$54_5$ immediately prior to the restart concerned based on status data stored in the status data store 19; a connection status determination controller 8, which compares intrinsic data stored respectively in HDD $54_1$–$54_5$ and nonvolatile memory $55_1$–$55_5$, and, immediately prior to restart, determines based on the pertinent comparison results the connection status, i.e. whether or not the HDD $54_1$–$54_5$ concerned have been replaced; and a recovery controller 9, which controls the commencement or continuation of recovery processing based on connection status data determined via this connection status determination controller 8, and the operational status data of each HDD $54_1$–$54_5$ immediately prior to reproduction by the prior status reproduction controller 7.

Because the initialization control controller 5 stores data intrinsic to the HDD in nonvolatile memory 55, the connection status determination controller 8 is able to compare intrinsic data stored respectively in HDD $54_1$–$54_5$ and nonvolatile memory $55_1$–$55_5$, and, immediately prior to restart, to determine, based on the pertinent comparison results, the connection status, i.e. whether or not the HDD $54_1$–$54_5$ concerned have been replaced. That is, when an HDD is replaced, the intrinsic data stored in nonvolatile memory will always differ from the intrinsic data of that replacement HDD, and conversely, when an HDD has not been replaced, this data will always match. Therefore, the connection status determination controller 8 is able to accurately determine the current connection status of the HDD.

Furthermore, the status data controller 6 rewrites in accordance with HDD $54_1$–$54_5$ status changes status data, which controls the operational status as to the presence or absence of HDD $54_1$–$54_5$ failure, and whether or not recovery processing is in progress, and stores this status data in the nonvolatile status data store 19. Consequently, even if the system goes down as a result of a power outage or something, when restarting the HDD $54_1$–$54_5$, the prior status reproduction controller 7 can reproduce the operational status of each HDD $54_1$–$54_5$ immediately prior to the pertinent restart based on the status data stored in this nonvolatile status data store 19. That is, even when an unexpected situation such as a system failure occurs, the operational status of each HDD $54_1$–$54_5$ immediately prior to that, i.e. "normal", "failed", "recovery processing in progress" can be reproduced.

Consequently, with this embodiment, based on the prior status reproduced by the prior status reproduction controller 7, and the current connection status of the HDD determined by the connection status determination controller 8, it is possible to control whether or not recovery processing will be implemented. The recovery control controller 9 determines the propriety of recovery based on prior status data and connection status data, and, for example, a recovery continuation control function allows recovery processing that was being implemented up until immediately prior to continue, or a recovery termination control function terminates recovery processing that was being implemented up until immediately prior.

That is, with a certain embodiment, the recovery controller 9 comprises a recovery continuation control function (S503→S518), which implements control that allows a pertinent recovery to continue when an HDD 54, determined by the prior status reproduction controller 7 to have been in the process of recovery up until immediately prior, is determined by the connection status controller 8 not to have been replaced during the time from the pertinent point immediately prior until present, and a recovery termination control function (S503→S517), which implements control that terminates a pertinent recovery when an HDD 54, determined by the prior status reproduction controller 7 to have been in the process of recovery up until immediately prior, is determined by the connection status controller 8 to have been replaced during the time from the pertinent point immediately prior until present.

In accordance with the recovery continuation control function, recovery processing continues automatically only when an HDD that was in the process of recovery up until immediately prior is not mistakenly replaced with another HDD. Therefore, even if an HDD on which other data is stored is mistakenly connected, the data on this HDD, on which other data is stored, is not overwritten.

And in accordance with the embodiment, the recovery controller 9 comprises a recovery propriety inquiry function (S504→S505), which queries the host system as to whether or not recovery should be implemented for a pertinent HDD 54 when the HDD 54, determined by the prior status reproduction controller 7 not to have been in the process of recovery up until immediately prior, is determined by the connection status controller 8 to have been replaced during the time from the pertinent point immediately prior until present. This requires that the host system always be queried as to the propriety of recovering the data of a pertinent HDD in cases where a failed HDD is replaced by a new HDD and recovery is possible. Therefore, even if an HDD on which other data is stored is mistakenly connected, by requiring confirmation from the host system, it is possible to effectively prevent a situation in which data is lost as a result of recovery processing.

Furthermore, in accordance with the embodiment, the recovery controller 9 comprises a recovery start control function (S504→S506), which implements control that allows recovery of a pertinent HDD 54, when the HDD 54, determined by the prior status reproduction controller 7 not to have been in the process of recovery up until immediately prior, is determined by the connection status controller 8 not to have been replaced during the time from the pertinent point immediately prior until present, and when this HDD 54 has been subjected to an operational test, and this operational test does not generate an error. That is, when an HDD determined to have failed once is not replaced, and does not generate an error during operational testing, since other data is not being stored on this HDD, recovery processing commences automatically.

Thus, with this embodiment, since an HDD connection error is detected, data is no longer lost as a result of human error. Furthermore, when a failed HDD is replaced, since recovery commences as a result of human intervention, the loss of data resulting from errors at time of replacement is prevented, and even if the system should go down after recovery commences, because automatic detection and recovery commence at restart, the need for inputting via the host system is eliminated.

An embodiment of the present invention is described in detail below with reference to the figures. With this embodiment, each of the above-described controllers enhances the reliability of the disk array system, and the status of each store is checked. Specifically, the writing of various data to each store is verified.

That is, with this embodiment, the disk array controller comprises an intrinsic data store verification controller, which, when intrinsic data is written to each nonvolatile memory 55, reads the intrinsic data written to this nonvolatile memory 55 and verifies whether or not the pertinent intrinsic data it reads matches the intrinsic data being written. Moreover, the status data controller 6 comprises an intrinsic data store failure determination function, which, when the intrinsic data store verification controller determines there is a mismatch, determines that there is a failure in the HDD 54 of this intrinsic data.

Further, in accordance with an embodiment, the intrinsic data store comprises a storage region, which allocates a single nonvolatile memory to each HDD 54. In this case, the intrinsic data store failure determination function comprises a function, which determines there are failures in all the HDD 54 when the intrinsic data store verification controller determines a mismatch with the intrinsic data stored in the storage region.

Furthermore, with this embodiment, the disk array controller comprises a status data store verification controller, which, when status data is written to the status data store (nonvolatile memory) 19, reads the status data written to this status data store, and verifies whether or not the pertinent status data it reads matches the status data being written.

Moreover, the status data controller 6 comprises a status data store failure determination function, which, when the status data store verification controller determines there is a mismatch, determines there are failures in all the HDD 54.

Thus, with this embodiment, because the status of each HDD is automatically detected at startup, and because nonvolatile memory failures are also detected, failures no longer occur when restarting a system after it has gone down.

The operation of this embodiment is explained below. An access request (a read or write request) from the host system 61 is input via an interface 52 to a disk array controller 3. The disk array controller 53 controls an HDD 54, and in accordance with the contents of the request, implements either a data read or data write. It also determines the status of HDD based on data in a nonvolatile memory 19, and determines the status of HDD based on data in a nonvolatile memory 55 and HDD intrinsic data.

The disk array controller 3 of this embodiment can be comprised of a control processor, a program memory for storing a program that operates this control processor, a memory for storing parameters used during operation, an interface for implementing read or write to each HDD 54, an interface to nonvolatile memory 55 corresponding to each HDD 54, respectively, and an interface to nonvolatile memory 19, which stores storage management data.

Initialization

First, the initialization operation is described.

This embodiment uses a 36-byte Inquiry data, containing a vendor name and serial number as intrinsic data D (i) that is read from an HDD and written to nonvolatile memory 55. Intrinsic data is not limited to this type of data. For example, random numbers, slot numbers, and data specifying dates and times can also be used, but this embodiment uses different intrinsic data corresponding to each HDD.

Figure 2:
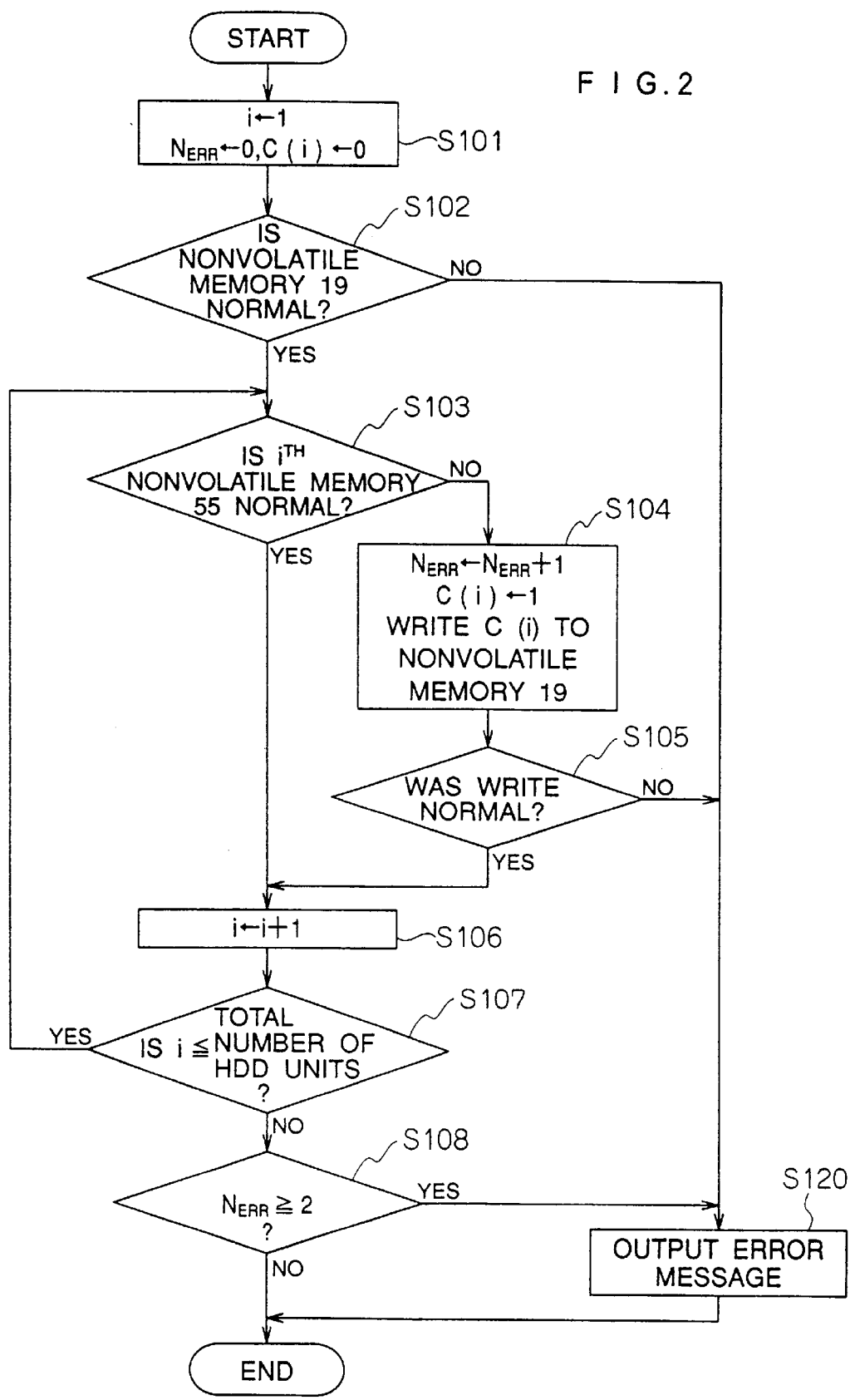
FIG. 2 is a flowchart depicting the first steps of initialization in accordance with this embodiment.
Figure 3:
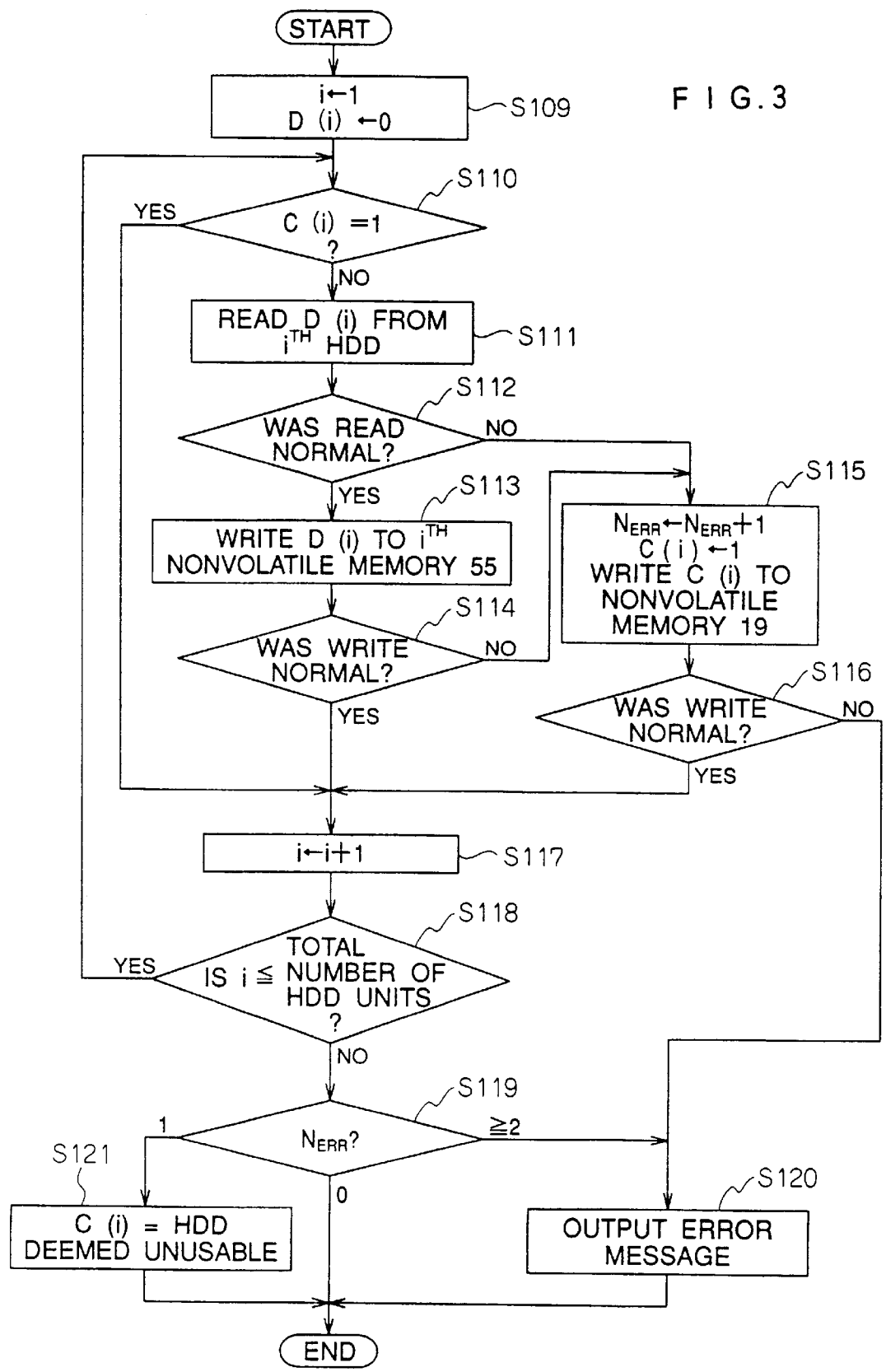
FIG. 3 is a continuation of the flowchart shown in FIG. 2 depicting the latter steps of initialization in accordance with this embodiment.

FIG. 2 is a flowchart depicting an example of an operation that checks whether nonvolatile memory 55, which serves as the intrinsic data store, and nonvolatile memory 19, which serves as the status data store are normal or not, and FIG. 3 is a flowchart depicting an example of an operation that continues initialization processing when each of these memories 55, 19 are normal, or one HDD is determined to be abnormal. This operation is started by an initialization command from the host system.

The disk array controller 53 that receives the initialization command sets "1" in variable i, which sequentially specifies each HDD, sets "0" in a failed HDD counter $N_{ERR}$, and sets "0" in storage management data array C(i), which specifies HDD determined to have failed (S101).

Counter i is the counter for identifying HDD, and the failed HDD counter $N_{ERR}$ is used to count the number of unusable HDD, and storage management data array C (i) sets "1" in HDD determined to be unusable.

These parameters are stored in memory resident in the disk array controller 3. Thereafter, the disk array controller 3 performs a test to verify whether or not nonvolatile memory 19 for storing storage management data is normal (S102).

When nonvolatile memory 19 for storing storage management data is not normal (N), a disk array system failure error message is output to the host system (S120), and initialization ends.

When nonvolatile memory 19 for storing storage management data is normal (S102: Y), a test is performed to verify whether the $i^{th}$ nonvolatile memory 55 is normal (S103).

When the $i^{th}$ nonvolatile memory 55 is normal (S103: Y), processing proceeds to S106, and when the $i^{th}$ nonvolatile memory 55 is not normal (S103: N), "1" is added to $N_{ERR}$, "1" is set in C (i), and C (i) is written to nonvolatile memory 19 for storing storage managem ent data (S104, initialization controller 5). That is, when the intrinsic data store nonvolatile memory 55 is abnormal, the HDD attached to this nonvolatile memory 55 is determined to have failed. When the storage management data C (i) write to this nonvolatile memory 19 is not normal (S105: N), a disk array system failure error message is output to the host system (S120), and processing ends. That is, when the status data store nonvolatile memory 19 is abnormal, the entire disk array system is determined to have failed. Conversely, when the write to nonvolatile memory 19 is normal (S105: Y), processing proceeds to S106.

At S106, "1" is added to parameter i, and when i is less than the total number of HDD (S107: Y), processing returns to S103, and the next nonvolatile memory 55 test is performed. When variable i becomes larger than the total number of HDD (S107: N), all nonvolatile memory 55 tests end, and the $N_{ERR}$ value is determined (S108).

When $N_{ERR}$ is "2" or more (S108: Y), for a system that recovers the data of 1 HDD unit, disk array system operation becomes impossible, a disk array system error message is output to the host system (S120), and initialization ends. When $N_{ERR}$ is "1" or less (S108: N), magnetic disk device operation is possible, and processing proceeds to S109 shown in FIG. 3.

In FIG. 3, at S109 "1" is set in counter i, and "0" is set in intrinsic data array D (i). Intrinsic data array D (i) is the array that stores intrinsic data stored beforehand in each HDD 54. At restart, this intrinsic data array D (i) is compared to array E (i), the intrinsic data of which is stored in each intrinsic data store nonvolatile memory 55.

When the $i^{th}$ nonvolatile memory 55 was not normal (S100: Y), processing proceeds to S117. When the $i^{th}$ nonvolatile memory 55 was normal (S110: N), HDD intrinsic data D (i) is read from the $i^{th}$ HDD (S111), and when the read cannot be performed normally (S112: N), "1" is added to $N_{ERR}$, "1" is set in C (i), and C (i) is written to nonvolatile memory 19 for storing storage management data (S115). When the write is not normal (S116: N), a disk array system failure error message is output to the host system (S120), and processing ends. When the write is normal (S116: Y), processing proceeds to S117.

When the $i^{th}$ HDD D (i) can be read normally (S112: Y), D(i) is written to the $i^{th}$ nonvolatile memory 55 (S113). When the write cannot be performed normally (S114: N), "1" is added to $N_{ERR}$, "1" is set in C (i), and C (i) is written to nonvolatile memory 19 for storing storage management data When this nonvolatile memory write is not normal (S116: N), a disk array system failure error message is output to the host system (S120), and processing ends. When this write is normal (S116: Y), processing proceeds to S117.

When the D (i) write to the $i^{th}$ nonvolatile memory 55 can be written normally (S114: Y), processing proceeds to S117. At S117, "1" is added to parameter i, and when i is less than the total number of HDD (S118: Y), processing returns to S110, and intrinsic data is read from the next HDD and written to nonvolatile memory 55.

When variable i becomes larger than the total number of HDD (S118: N), the $N_{ERR}$ value is determined (S119). When $N_{ERR}$ is "0", all HDD and nonvolatile memory 55 are normal, and initialization is complete.

When $N_{ERR}$ is "2" or more, magnetic disk device operation becomes impossible, a failed magnetic disk device error message is output to the host system (S120), and initialization ends. A magnetic disk device determined to have failed cannot be operated as a storage unit.

And when $N_{ERR}$ is "1", data cannot be made redundant, but since the magnetic disk device can be operated as a storage unit, C (i) becomes "1", making the HDD unusable (S121), and initialization ends.

The initialization operation depicted in FIG. 3 is controlled by an initialization controller 5.

When a Failure Occurs

The following explanation describes the operation performed when a disk array system is being used as a storage unit, and one of the HDD $54_1$–$14_5$ fails. When a failure occurs in one of the HDD, the disk array controller 3 changes the storage management data of the nonvolatile memory 19. Specifically, it rewrites to "1" the storage management data bit corresponding to the failed HDD in the disk array system.

When using a different format system for the storage management data, this method of changing that data is revised accordingly. For example, if all bits indicating storage management data are set to "1" for normal operation, the system can be configured so that the storage management data bit becomes "0" when a failure occurs.

At Recovery Processing

Further, with this embodiment, the bit that indicates a failed HDD, and the bit that -ndicates an HDD is in the midst of a recovery operation are utilized, respectively, as the storage management data C (i), which indicates the HDD status written to nonvolatile memory 19. When all HDD are operating normally, the bit indicating a failed HDD are all "0", and when a failed HDD exists, the bit corresponding to that failed HDD is "1".

The bit indicating that an HDD is in the midst of a recovery operation is "1" for an HDD undergoing recovery. Only 1 recovery bit is set to "1" at this time. With this embodiment, restart processing is controlled on the basis of data indicating whether or not this recovery operation is being performed.

Restart

With the disk array system of this embodiment, when device restart is performed based on the storage management data in nonvolatile memory 19, and HDD intrinsic data and the intrinsic data stored in nonvolatile memory 55, the status of each HDD is determined using the following procedure.

The flow of operations of the disk array controller 53 during restart is depicted in FIGS. 4 through 8. The continuity of the processing shown in FIGS. 4 through 8 is represented by the symbols A, B, C, D, E, F.

First of all, "1" is set in counter i, "0" is set in failed HDD counter $N_{ERR}$, "0" is set in failed HDD identification parameter $N_{DISK}$, "0" is set in storage management data array C (i), which indicates the failure status stored in nonvolatile memory 19, "0" is set in intrinsic data array D (i) read from each HDD, "0" is set in intrinsic data array E (i) read from each nonvolatile memory 55, and "0" is set in storage management data array F (i), which indicates the recovery status stored in nonvolatile memory 19 (S401).

Then, storage management data array C (i), which indicates the status of each HDD, and storage management data array F (i), which indicates the recovery status are read from nonvolatile memory 19 (S402). When this read cannot be performed normally (S403: N), a disk array system failure error message is output (S516), and processing ends.

When this read can be performed normally (S403:Y), and C(i) is "1" (S404: Y), processing shifts to S415 shown in FIG. 5, intrinsic data is read from the $i^{th}$ HDD and stored in D(i) (S415). When the read is not normal (S417: N), processing proceeds to S420.

Conversely, when the read is normal (S417: Y), E (i) is read from the $i^{th}$ nonvolatile memory (S416). If this read is not normal (S418: N), processing proceeds to S420, and if it is normal (S418: Y), processing proceeds to S412.

At S420, a partial rewrite is done on the intrinsic data so that intrinsic data D (i) read from the $i^{th}$ HDD differs from the intrinsic data read from the $i^{th}$ nonvolatile memory, and processing proceeds to S412. The rewriting of intrinsic data at this step S420 records the fact that an abnormality exists in the $i^{th}$ nonvolatile memory. At S412, 1 is added to $N_{ERR}$, i is set in $N_{DISK}$, and processing proceeds to S413 shown in FIG. 6.

Figure 4:
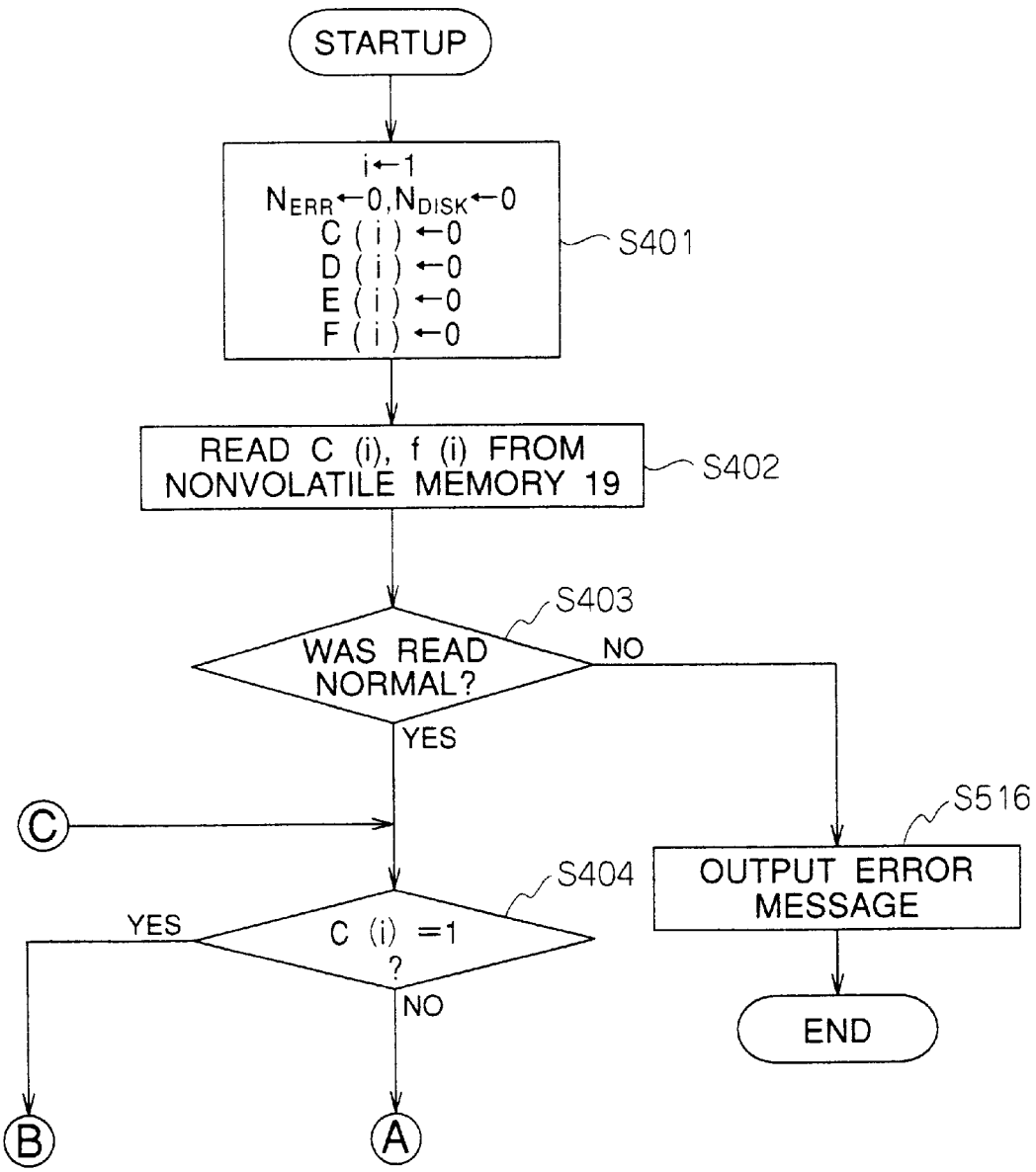
FIG. 4 is a flowchart depicting an example of an operation, whereby processing branches during startup processing in accordance with this embodiment as a result of an HDD failure status immediately prior to startup.

At step S404 shown in FIG. 4, if C (i) is not 1 (S404: N), that is, with regard to an HDD that was not failing immediately prior to restart, processing shifts to step S405 shown in FIG. 6, and intrinsic data D (i) is read from this $i^{th}$ HDD (S405). When the read cannot be performed normally (S406: N), processing proceeds to S419, and when the read can be performed normally (S406: Y), stored intrinsic data E (i) is read from the $i^{th}$ nonvolatile memory 55 (S407). When the intrinsic data E (i) read cannot be performed normally (S408: N), processing proceeds to S419.

At S419, when an abnormality exists in the HDD or its nonvolatile memory 55, a partial rewrite is done on the intrinsic data so that intrinsic data D (i) read from the $i^{th}$ HDD differs from the intrinsic data read from the $i^{th}$ nonvolatile memory, and processing proceeds to S410.

When the intrinsic data E (i) read can be performed normally (S408: Y), intrinsic data D (i) read from the $i^{th}$ HDD is compared against the intrinsic data E (i) read from the $i^{th}$ nonvolatile memory 55, and when D (i) and E (i) differ (S409: N), processing proceeds to S410. When D (i) and E (i) are equivalent (S409: Y), processing proceeds to S413. When a mismatch occurs at this S409, that means this HDD has been replaced.

Consequently, at S410 "1" is added to $N_{ERR}$, i is set in $N_{DISK}$, "1" is set in C (i), and C (i) is written to nonvolatile memory 19 for storing storage management data (S410). When the write is not normal (S411: N), a disk array system failure error message is output, and when the write is normal (S411: Y), processing proceeds to S413.

Furthermore, at S413 "1" is added to parameter i, and when i is less than the total number of HDD (S414: Y), processing returns to S404 shown in FIG. 4, the intrinsic data of the next HDD is compared against the intrinsic data on the nonvolatile memory 55.

Repeating this operation until i becomes larger than the total number of HDD (S414: N) sets the number of abnormal HDD in $N_{ERR}$, and sets the bit that identifies failed HDD in storage management data C (i).

This also detects a disk array system failure resulting from a failure of nonvolatile memory 55 storing storage management data. At S419 and S420, "FFh" is written to D(i), and "OOh" is written to E (i), but these are not fixed values, and they can be changed. This is because there are cases when the read fails but normal data is sent, so that, depending on the circuit design method and data storage method, these values need not be used all the time.

Figure 5:
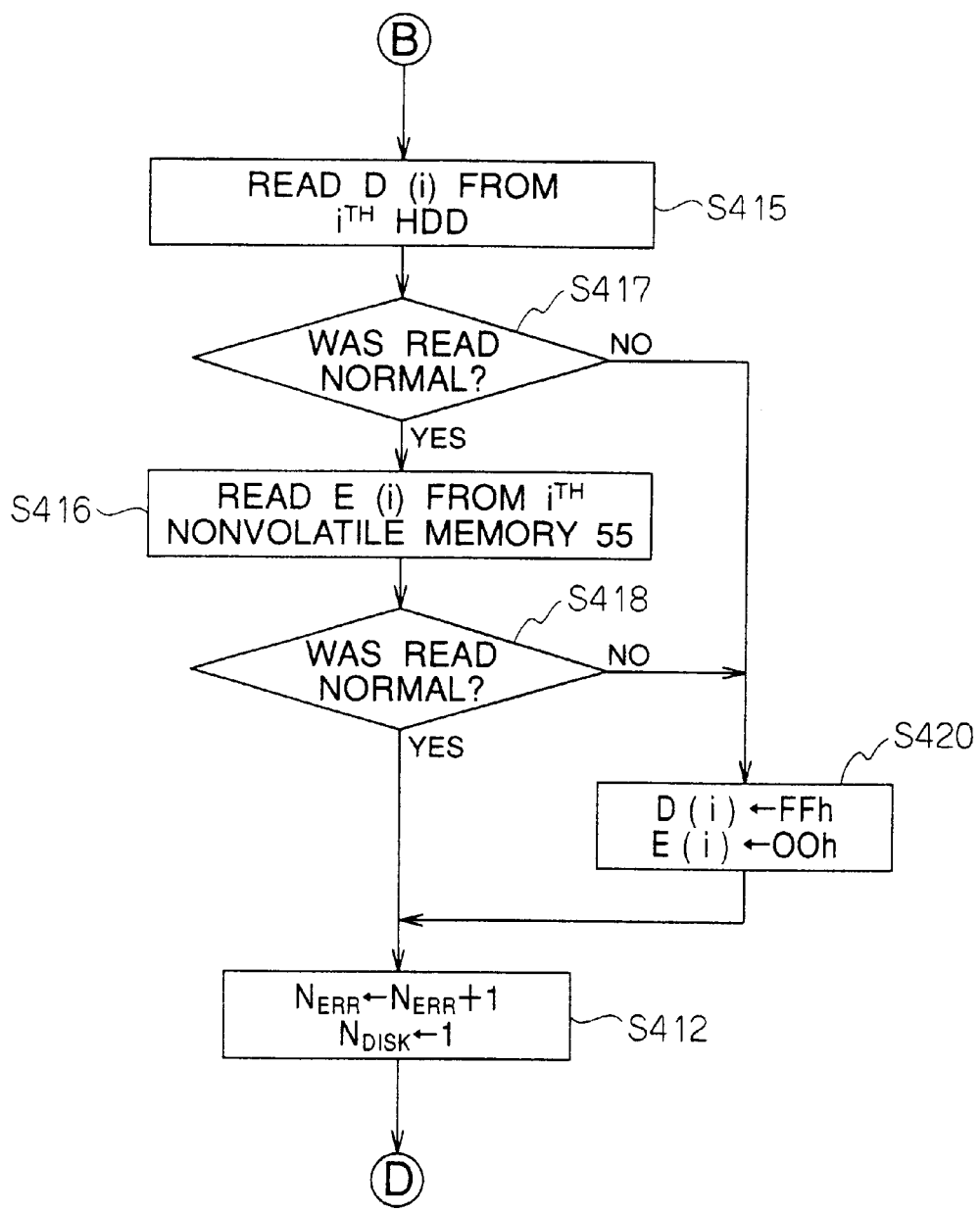
FIG. 5 is a continuation of the flowchart shown in FIG. 4 depicting an example of a connection status confirmation process when an HDD fails immediately prior to startup during startup processing in accordance with this embodiment.
Figure 6:
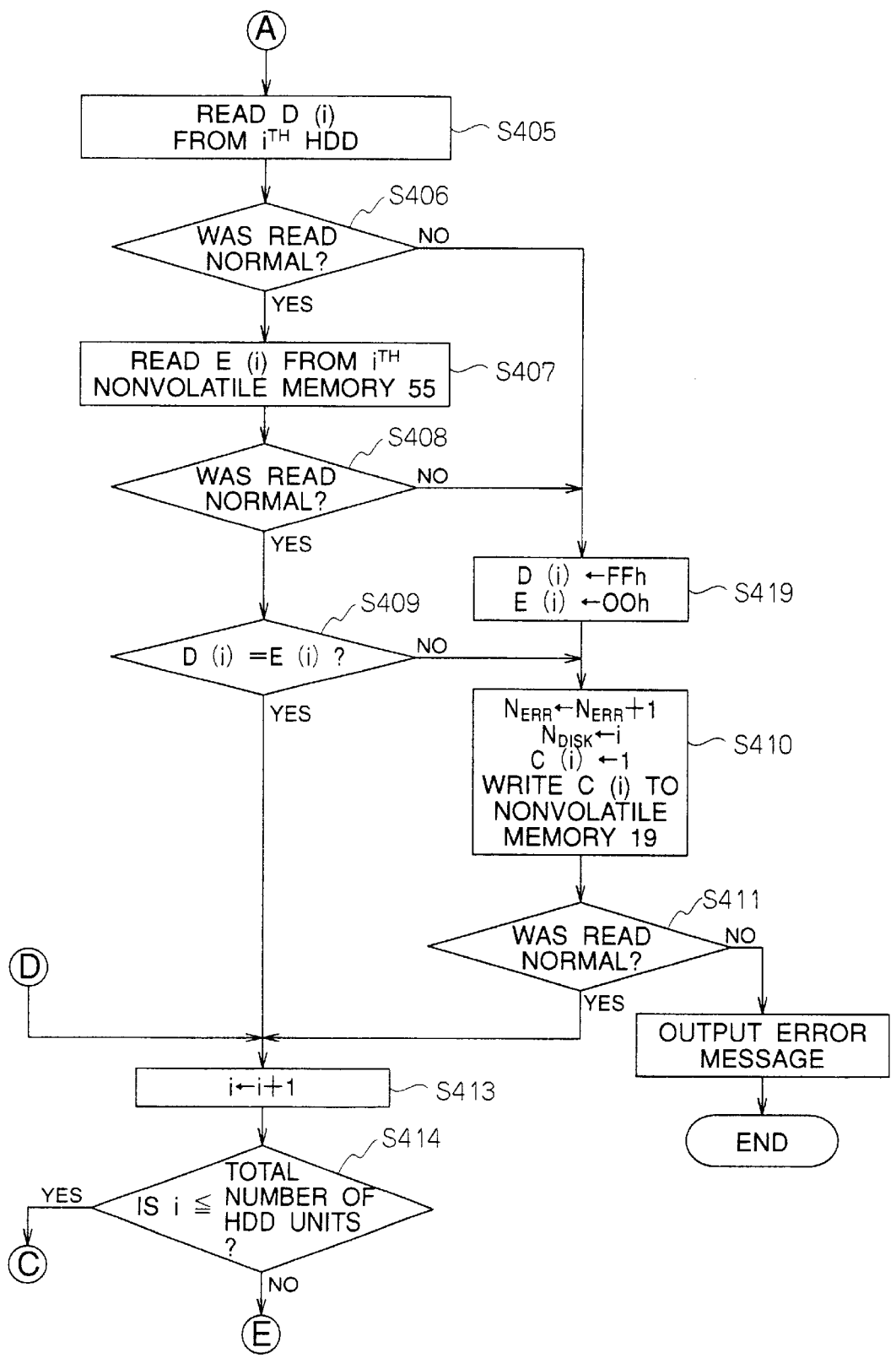
FIG. 6 is a continuation of the flowchart shown in FIG. 4 depicting an example of a connection status confirmation process when an HDD does not fail immediately prior to startup during startup processing in accordance with this embodiment.

The processing depicted in FIGS. 4 through 6 confirms the connection status of the current HDD. When an HDD has been replaced, the number of that replaced HDD is stored in $N_{DISK}$. This connection status confirmation is performed by a connection status determination controller 8.

Figure 8:
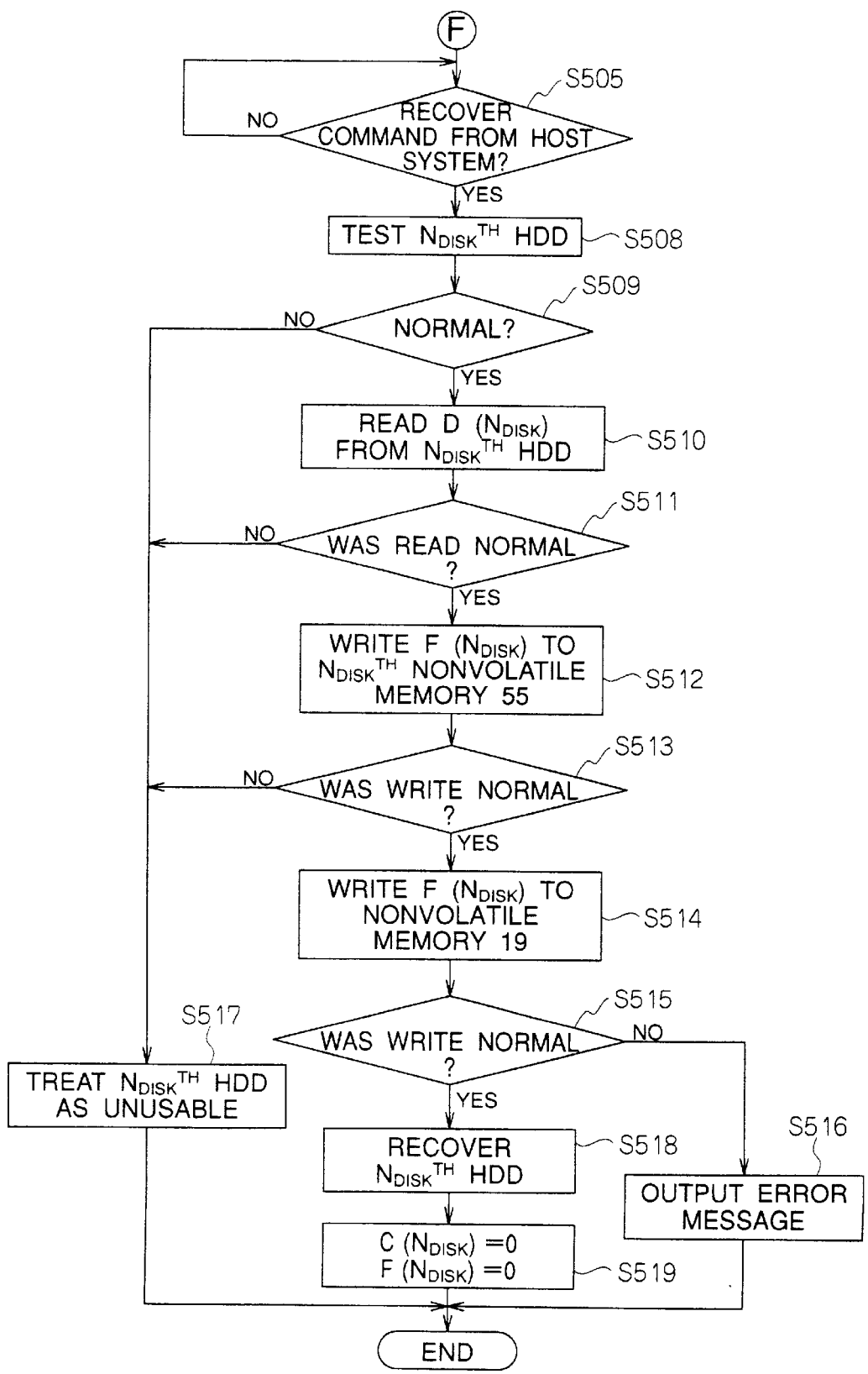
FIG. 8 is a flowchart depicting processing when recovery processing is not carried out immediately prior to the startup operation shown in FIG. 7, and an HDD has been replaced.

Next, the processing shown in FIGS. 7 and 8 is performed. First, a determination is made concerning the failed HDD counter $N_{ERR}$ (S5011). When $N_{ERR}$ is "0", all HDD are normal, and the start operation ends.

When $N_{ERR}$ is "2" or more, the redundancy of the disk array system of the embodiment cannot cover all the failures, a failed magnetic disk device error message is output (S516), and processing ends.

When $N_{ERR}$ is "1", a determination is made, based on storage management data F ($N_{DISK}$) indicating the recovery status, as to whether or not recovery was in progress prior to turning OFF the power (S502). If recovery was in progress prior to turning OFF the power (S502: Y), intrinsic data D($N_{DISK}$) read from the HDD is compared against intrinsic data E($N_{DISK}$) read from nonvolatile memory 55 to determine if they are the same (S504). If, as a result of this comparison, it is determined that the HDD specified by F ($N_{DISK}$) has not been replaced, recovery processing is automatically carried out from Step S518 on. Conversely, if the intrinsic data differs (S503: N), the HDD concerned is deemed unusable (S517).

At S502, if recovery processing is not in progress prior to turning the power OFF, intrinsic data D ($N_{DISK}$) read from the HDD is compared against intrinsic data E ($N_{DISK}$) read from nonvolatile memory 55 to determine if they are the same. When they are the same (S504: Y), because the HDD was initially determined to have failed, this $N_{DISK}^{th}$ HDD is tested once again to determine if it is operating normally or not (S506). Then, if it is normal (S507: Y), a 1 is stored in storage management data array F ($N_{DISK}$), which indicates recovery status, and recovery processing is performed automatically (S518). On the other hand, if the $N_{DISK}^{th}$ HDD tests abnormal (S507: N), the HDD concerned is deemed unusable (S517).

Further, at S504, when intrinsic data D ($N_{DISK}$) read from the HDD is compared against intrinsic data E ($N_{DISK}$) read from nonvolatile memory 55 to determine if they are the same, if these intrinsic data are found to differ (S504: N), that is, when an HDD that was not failing is replaced, processing shifts to Step S505 shown in FIG. 8, and the disk array system waits for a recovery command from the host system (S505). Then, when the recovery command is received (S505: Y), the $N_{DISK}$ th HDD is tested (S508), and when the results of the HDD test are not normal (S509: N), it is deemed unusable (Step S517). When the HDD test is normal (S509: Y), D ($N_{DISK}$) is read from the $N_{DISK}^{th}$ HDD (S510).

When the read cannot be performed normally (S511: N), processing proceeds to S517. When the read can be performed normally (S511: Y), D ($N_{DISK}$) is written to $N_{DISK}^{th}$ nonvolatile memory 55 (S512).

When D ($N_{DISK}$) cannot be written normally to nonvolatile memory 55 (S513: N), processing proceeds to S517. When this write can be performed normally (S513: Y), "1" is set in storage management data F ($N_{DISK}$), which indicates recovery status, and F ($N_{DISK}$) is written to nonvolatile memory 19 (S514).

When this write cannot be performed normally (S515: N), processing proceeds to process 2, and when the write can be performed normally (S515: Y), recovery work commences (S518).

At S518 shown in FIGS. 7 and 8, recovery work, whereby data reconstructed from data contained in another HDD is written to the $N_{DISK}^{th}$ HDD, is carried out (S518). When recovery work ends, a "0" is set in each of storage management data C ($N_{DISK}$), F ($N_{DISK}$) (S519), and the restart operation ends.

The magnetic disk device of the embodiment described above comprises intrinsic data-storing nonvolatile memory corresponding to each HDD, and utilizes separate nonvolatile memory for storing storage management data. However, there are cases when only one nonvolatile memory is used for storing intrinsic data, and this memory is divided into storage regions for storing the intrinsic data of individual HDD, and other cases when all storage management data and intrinsic data is stored on different regions of a single nonvolatile memory. At these times, it is necessary to make changes so that when S103, S113 are N, processing shifts to S120, when S408, S418 are N, processing shifts to process 2, and when S512 is N, processing shifts to S516.

This is so, when using a single nonvolatile memory to store intrinsic data, the operation of that nonvolatile memory itself becomes odd when a read or write fails in a single region. This is also so the nonvolatile memory is not used even when a read or write succeeds in another region of this nonvolatile memory, because the reliability of that data drops drastically.

The magnetic disk device of the embodiment employs a redundancy configuration which can only recover 1 HDD unit. But increasing the failed HDD identification parameter according to the number of recoverable units, and using branching conditions in accordance with the failed HDD unit counter makes it possible to adopt a redundancy configuration that enables the recovery of 2 or more HDD units.

Further, the magnetic disk device of the embodiment is configured so that recovery is partially automated at startup for recoverable disks. But it can also be configured without this mechanism so that recovery work commences in accordance with a command for the host system.

Procedure for Determining Recovery Processing Based on Connection Status and Status Data

| | Recovery in Progress | Recovery Not in Progress |
|---|---|---|
| Replaced | Cancel recovery (S503–S517) | Query host (S503–S517) |
| Not replaced | Recovery automatically continues (S503–S518) | Operation test (S504–S506) |

As explained above, in accordance with this embodiment, the propriety of recovery processing is determined on the basis of connection status and status data, as shown in the above-cited procedures for determining recovery processing. In particular, because the status of each HDD is automatically detected at startup, and nonvolatile memory failure is also detected, failure does not occur during restart after a system has gone down. And since HDD connection errors are also detected, data is no longer lost due to human error. And furthermore, when a failed HDD is replaced, since recovery commences as a result of human intervention, the loss of data resulting from errors during replacement is prevented, and even if the system should go down after recovery commences, because automatic detection and recovery commence at restart, the need for inputting via the host system is eliminated.

The invention may be embodied in other specific forms without departing from the spirit or essential characteristic thereof. The present embodiments is therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 9-056234 (Filed on Mar. 11$^{th}$, 1997) including specification, claims, drawings and summary are incorporated herein by reference in its entirety.

What is claimed is:

1. A method of operating a disk array comprising a plurality of physical disks, an intrinsic data memory for storing intrinsic data read from the disks, an array controller for controlling the disks, and a status data memory for storing status data indicating the control status of the array controller, the operation method comprising the steps of:
    reading intrinsic data from each of the disks at startup;
    checking the connection status of the array controller and disks by comparing intrinsic data read from the disks with intrinsic data stored in the intrinsic data memory, and determining whether a disk has been replaced; and
    determining whether to perform recovery processing for data stored on one of the disks in accordance with the connection status of the controller and disks, and the status data stored in status data memory.

2. The method of operating a disk array according to claim 1, further comprising the steps of:
    storing the fact that recovery processing commenced in status data memory at the time recovery processing commenced; and
    continuing recovery processing when status data relating the commencement of recovery processing is stored in status data memory at startup, and the results of a connection status check indicate a disk has not been replaced.

3. The method of operating a disk array according to claim 1, further comprising the step of:
    storing the fact that recovery processing commenced in status data memory at the time recovery processing commenced; and
    canceling the recovery processing when status data relating the commencement of recovery processing is stored in status data memory at startup, and the results of a connection status check indicate a disk has been replaced.

4. The method of operating a disk array according to claim 1, further comprising the step of:
    sending a query to a host system regarding whether recovery should be performed for one of the disks when status data relating to the commencement of recovery processing is not stored in status data memory at startup, and said one of the disks has been replaced at a point in time prior to startup.

5. The method of operating a disk array according to claim 1, further comprising the step of:
    testing an operation of one of the disks when status data relating to the commencement of recovery processing is not stored in status data memory at startup, and said one of the disks has not been replaced at a point in time prior to startup; and
    said one of the disks is recovered if an error does not occur as a result of the operation test.

6. A disk array controller internal to a disk array system comprising a plurality of disks, and an intrinsic data memory storing the respective intrinsic data of each of the disks, the controller comprising:
    a status data memory storing status data indicating the status of the disk array system;
    a processor causing the disk array system to:
        read intrinsic data from each of the disks when each disk is initialized;
        store in the intrinsic data memory the intrinsic data read from each disk;
        store in status data memory data on an unusable disk;
        store in status data memory data on a disk that has commenced recovery processing;
        determine whether a disk has been replaced prior to startup by comparing the intrinsic data of each of the disks with the contents of intrinsic data memory at startup;

reproduce the status of each disk immediately prior to startup on the basis of data stored in status data memory; and determine whether to continue or to cancel recovery processing on the basis of disk connection status and disk status immediately prior to startup.

7. The disk array controller according to claim 6, wherein intrinsic data includes a disk serial number.

8. The disk array controller according to claim 6, wherein status data is an array that conforms to the number and sequence of the disks, and includes an array that specifies an unusable disk and an array that specifies a disk undergoing recovery processing.

9. The disk array controller according to claim 6, wherein the processor further causes the disk array system to:

verify when status data is stored in status data memory; and report to a host that the entire disk array system is abnormal when an abnormality exists in the status data memory.

10. The disk array controller according to claim 6, wherein the processor further causes the disk array system to:

verify when intrinsic data is stored in intrinsic data memory; and determine as an unusable disk that corresponds to intrinsic memory when an abnormality exists in the intrinsic memory.

11. A disk array controller internal to a disk array system comprising a plurality of disks, and an intrinsic data memory storing the respective intrinsic data of each of the disks, the controller comprising:

a status data memory storing status data indicating the status of the disk array system; and a processor controlling the disk array system, comprising:
means for reading intrinsic data from each of the disks when each disk is initialized;
means for storing in the intrinsic data memory the intrinsic data read from each disk;
means for storing in status data memory data on an unusable disk;
means for storing in status data memory data on a disk that has commenced recovery processing;
means for determining whether a disk has been replaced prior to startup by comparing the intrinsic data of each disk with the contents of intrinsic data memory at startup;
means for reproducing the status of each disk immediately prior to startup on the basis of data stored in status data memory; and
means for determining whether to continue or to cancel recovery processing on the basis of disk connection status and disk status immediately prior to startup.

12. A disk array system, comprising:

a plurality of physical disks distributing and storing data having parity;

an intrinsic data memory storing intrinsic data of the physical disks;

a disk array controller computing a result equal to an Exclusive OR of data sent from a host, and storing said result together with the data by distributing it to the disks;

a status data memory storing status data indicating the status of the disk array;

wherein the controller is capable of performing the following operations:

reading intrinsic data from each of the disks when each disk is initialized;

storing in intrinsic data memory the intrinsic data read from each disk;

deeming as unusable a disk that corresponds to the intrinsic data memory when intrinsic data cannot be stored normally in the intrinsic data memory;

storing in status data memory data on an unusable disk;

storing in status data memory data on a disk that has commenced recovery processing;

determining whether a disk has been replaced prior to startup by comparing the intrinsic data of each of the disks with the contents of intrinsic data memory at startup;

reproducing the status of each disk immediately prior to startup on the basis of data stored in status data memory; and determining whether to continue or to cancel recovery processing on the basis of disk connection status and disk status immediately prior to startup.

13. A disk array system, comprising:

a plurality of physical disks distributing and storing data having parity;

an intrinsic data memory storing intrinsic data of the physical disks;

a disk array controller computing asult equal to an Exclusive OR of data sent from a host, and storing said result together with the data by distributing it to the disks;

a status data memory storing status data indicating the status of the disk array;

wherein the controller comprises:
means for reading intrinsic data from each of the disks when each disk is initialized;
means for storing in intrinsic data memory the intrinsic data read from each disk;
means for deeming as unusable a disk that corresponds to the intrinsic data memory when intrinsic data cannot be stored normally in the intrinsic data memory;
means for storing in status data memory data on an unusable disk;
means for storing in status data memory data on a disk that has commenced recovery processing;
means for determining whether a disk has been replaced prior to startup by comparing the intrinsic data of each of the disks with the contents of intrinsic data memory at startup;
means for reproducing the status of each disk immediately prior to startup on the basis of data stored in status data memory; and
means for determining whether to continue or to cancel recovery processing on the basis of disk connection status and disk status immediately prior to startup.

14. The disk array system according to claim 13, wherein the disk array controller further comprises:

means for storing the fact that recovery processing commenced in status data memory at t he time recovery processing commenced; and means for continuing recovery processing when status data relating the commencement of recovery processing is stored in status data memory at startup, and the results of a connection status check indicate a disk has not been replaced.

15. The disk array system according to claim 14, wherein the disk array controller further comprises:

means for canceling recovery processing when status data relating the commencement of recovery processing is stored in status data memory at startup, and the results of a connection status check indicate a disk has been replaced.

16. The disk array system according to claim 14, wherein the disk array controller further comprises:

means of querying the host regarding whether recovery should be performed for one of the disks when status data relating to the commencement of recovery processing is not stored in status data memory at startup, and said one of the disks has been replaced at a point in time prior to startup.

17. The disk array system according to claim 16, wherein the disk array controller further comprises:

means for testing an operation of one of the disks when status data relating to the commencement of recovery processing is not stored in status data memory at startup, and said one of the disks has not been replaced at a point in time prior to startup; and means for recovering said one of the disks if an error does not occur as a result of the operation test.

18. A computer program product stored on a storage medium for controlling a disk array comprising a processor; a plurality of physical disks; an intrinsic data memory for storing intrinsic data read from the disks; an array controller for controlling the disks; and a status data memory for storing status data indicating the control status of the array controller; wherein the program causes the disk array to:

read intrinsic data from each of the disks at startup;

check the connection status of the array controller and disks by comparing intrinsic data read from the disks with intrinsic data stored in memory, thereby determining whether a disk has been replaced; and determine, in accordance with the connection status of the controller and disks, and the status data stored in status data memory, whether to perform recovery processing for data stored on one of the disks.

19. The computer program product according to claim 18, wherein the computer program further causes the disk array store the fact that recovery processing commenced in status data memory at the time recovery processing commenced; and continue recovery processing when status data relating the commencement of recovery processing is stored in status data memory at startup, and the results of a connection status check indicate a disk has not been replaced.

20. The computer program product according to claim 19, wherein the computer program further causes the disk array to:

cancel recovery processing when status data relating the commencement of recovery processing is stored in status data memory at startup, and the results of a connection status check indicate a disk has been replaced.

21. The computer program product according to claim 19, wherein the computer program further causes the disk array to:

query a host system regarding whether recovery should be performed for one of the disks when status data relating to the commencement of recovery processing is not stored in status data memory at startup, and said one of the disks has been replaced at a point in time prior to startup.

22. The computer program product according to claim 21, wherein the computer program further causes the disk array to:

test one of the disks when status data relating to the commencement of recovery processing is not stored in status data memory at startup and said one of the disks has not been replaced at a point in time prior to startup; and recover said one of the disks if an error does not occur as a result of the operation test.

* * * * *